2,699,449 p-ISOAMOXY-BENZALDEHYDE THIOSEMI-CARBAZONE

Jack Bernstein, New Brunswick, William A. Lott, Maplewood, and Frederick Y. Wiselogle, New Brunswick, N. J., assignors to Olin Mathieson Chemical Corporation, New York, N. Y., a corporation of Virginia No Drawing. Application March 13, 1952,
Serial No. 276,438

1 Claim. (Cl. 260—552)

This invention relates to a substituted-benzaldehyde thiosemicarbazone and a method for the preparation thereof.

A large number of substituted-benzaldehyde thiosemicarbazones have been prepared heretofore (cf. Hoggarth et al., Brit. J. Pharmacol., 4, 248, and Domagk et al., Naturwissenschaften, 33, 315, inter alia) and screened for antituberculous activity, but these compounds (notably p - acetamido - benzaldehyde thiosemicarbazone) have failed to survive extensive clinical trial due to high toxicity. As part of this screening program, several p-(lower alkyl)-oxy-benzaldehyde thiosemicarbazones have been prepared and tested orally in mice for antituberculous activity, toxicity, etc.; but the results of tests of these compounds were not sufficiently promising to indicate that the (lower alkyl)-oxy-benzaldehyde thiosemicarbazone series should be further investigated.

Despite this contraindictation, applicants have further investigated this series, and provided a novel compound, p-isoamoxy-benzaldehyde thiosemicarbazone, which is outstanding in the series with respect to activity and other significant factors, and is a utilizable and valuable chemotherapeutic agent, especially an antituberculous agent. As illustrative of its outstanding character, the p-isoamoxy compound, besides being highly effective as an antituberculous agent, is of remarkably low toxicity, and can be administered in dosages much above 100 mg., the maximum safe dose for p-acetamido-benzaldehyde thiosemicarbazone.

Following is a specific embodiment illustrative of the invention:

Example (a) 183 g. isoamyl bromide and 80 g. sodium hydroxide are added to a solution of 148 g. p-hydroxy-benzaldehyde in 600 ml. cyclohexanol and the resulting mixture is refluxed for 6 hours, then cooled to room temperature and filtered. The residue is washed twice with 100 ml. portions of cyclohexanol and the washings are added to the filtrate. Cyclohexanol is separated from the combined filtrate and washings under reduced pressure. The resulting solution is suspended in 400 ml. water and extracted with 500 ml. ether, then with 200 ml. ether. The combined ether extracts are washed with 100 ml. 20% sodium carbonate, then dried over anhydrous potassium carbonate and concentrated by heating on a steam bath. The residue is distilled under reduced pressure and the fraction boiling at 87° C. at 0.04 mm. is collected. The product, p-isoamoxy-benzaldehyde, is obtained in a yield of about 178 g.

(b) A solution of 96 g. of p-isoamoxy-benzaldehyde in 600 ml. hot ethanol is added to a solution of 45.5 g. thiosemicarbazide in 500 ml. hot water. After adding 200 ml. hot ethanol, the reaction mixture is refluxed for 10 minutes, then cooled to room temperature and allowed to stand overnight to complete precipitation (substantially complete precipitation takes place almost immediately). The crystalline product is separated by filtering and air-dried; on recrystallization from 1200 ml. of 50% ethanol, pure crystals melting at 134–135° C. are obtained in a yield of about 80%.

Like the compound p-acetamido-benzaldehyde thiosemicarbazone [also known as p-formyl-acetanilide thiosemicarbazone], the compound of this invention is active perorally, and may be administered in the same pharmaceutical forms, i. e. dispersed or solubilized in an aqueous medium (as an inhalation aerosol or spray), or in dosage-unit carries of the solid type (e. g. tablets or capsules). Thus, it may be incorporated in gelatin capsules each containing of the order of 25–200 mg. of the product. Alternatively, tablets containing of the order of 25–200 mg. of the compound of this invention may be formed by preparing a granulation of the compound with such binders as acacia, lactose and starch [i. e. moistening, adding one or more of these binders, drying, screening, and adding a lubricant, such as stearic acid powder], and compressing the granulation into tablets each containing the selected dosage.

The compound of this invention is also useful as an environmental antituberculous agent, e. g. in hospital and dairy sanitation. For this purpose, it is incorporated in the usual carriers, e. g. aerosols and detergent solutions.

The invention may be variously otherwise embodied within the scope of the appended claim.

We claim:

p-Isoamoxy-benzaldehyde thiosemicarbazone.

References Cited in the file of this patent

Behnisch et al., "Angewante Chemie," vol. 60, May 1948, p. 114.

Hoggarth et al., "Br. J. Pharmacol.," vol. 4 (1949), pp. 248 and 249.

Donovick et al., "J. Bacteriology," vol. 59 (1950), p. 670.

Bernstein, Yale, Losee, Halsing, Martins and Lott, "J. Am. Chem. Soc." vol. 73, Mar. 1951, pp. 906–8.